Dec. 5, 1939.  H. P. HAYDEN ET AL  2,182,082

VISCOSIMETER

Filed June 23, 1937   2 Sheets-Sheet 1

WITNESS:  INVENTORS
Robt R Mitchel  Harold P. Hayden &
Herbert E. Schweyer
BY
Busser + Harding
ATTORNEYS.

Dec. 5, 1939.  H. P. HAYDEN ET AL  2,182,082
VISCOSIMETER
Filed June 23, 1937   2 Sheets-Sheet 2

WITNESS:

INVENTORS
Harold P. Hayden &
Herbert E. Schweyer
BY
Busser & Harding
ATTORNEYS.

Patented Dec. 5, 1939

2,182,082

UNITED STATES PATENT OFFICE 2,182,082

VISCOSIMETER

Harold P. Hayden, Sewaren, and Herbert E. Schweyer, Rahway, N. J., assignors to Barber Asphalt Corporation, a corporation of New Jersey Application June 23, 1937, Serial No. 149,906

9 Claims. (Cl. 265—11)

This invention is directed to an improved type of viscosimeter, and in particular, is directed to an improved form of coaxial cylinder viscosimeter adapted for use in measuring the viscosities of relatively viscous materials.

It is known that the viscosities of relatively viscous materials, such as asphalts, tars, pitches, resins, and the like, may be determined by measuring the rate of laminar flow in a body of such material. Such determination may conveniently be accomplished by filling the hollow annular space between two coaxial cylinders, the larger of which is hollow, with the material the viscosity of which is to be determined. The outer cylinder is then held stationary, and the inner cylinder is moved vertically along the common axis of the two under known loads. Under such conditions the rate of movement of the inner cylinder with respect to the outer stationary cylinder is a function of the viscosity of the material under test.

For a complete discussion of this method of determining the viscosity, and of the theoretical considerations involved, reference is made to an article by A. Pochettino, entitled "The Properties of Plastic Materials", published in "Nuovo Cimento", vol. 8, pages 77–92, in the year 1914.

It is the purpose of the present invention to provide an instrument capable of measuring easily and rapidly, even in the hands of a relatively inexperienced observer, the viscosity of viscous materials, such as, for example, asphalts, tars, pitches, and the like.

The viscosimeter, in accordance with the present invention, makes use of a pair of coaxial cylinders to measure the viscosity of the sample under test, but is so arranged that the extent of movement of the inner cylinder in any given time or the time required for a given movement to occur may be easily and directly determined from the instrument and converted directly into viscosity values. Furthermore, the viscosimeter, in accordance with this invention, makes it possible to determine easily and rapidly both the "upward" and "downward" movements of the inner cylinder without the necessity of handling or otherwise disturbing the sample undergoing test.

In the drawings, which represent a preferred form of the improved viscosimeter in accordance with this invention, Figure 1 is a side elevation, partly in section, of such preferred form of viscosimeter.

Figure 3:
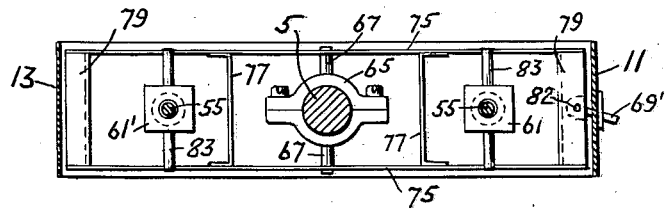
Figure 3 is a horizontal section taken on the line 3—3 of Figure 1.

The base 1 of the instrument is provided with a plurality of levelling screws 3, and serves as a support for the column 5 extending vertically from the center portion of the base, from which column all the remaining parts of the instrument are supported.

The body of the instrument comprises a pair of lower side members 7 secured to the column 5, and a pair of upper side members 9 likewise secured to the column 5 adjacent the upper end thereof. A front plate 11 is secured to the side members 7, 9 at one end thereof, and a back plate 13 to the side members at the other end thereof. The front and back plates are connected at the top by a cover plate 15.

Secured to the upper side members 9, and to the upper end of the column 5, is a block 17 provided with spaced apart side plates 19, between which is positioned a balance arm 21 supported on a shaft 23 journaled in bearings 25, which are secured in the side plates 19. Extending horizontally from the rear end of the balance arm 21 is a threaded rod 27, along which a small weight 29 is adjustable and may be locked in position by means of the nut 30. Extending in a generally horizontal direction from the front end of the balance arm 21 is an upper arm 31 and a lower arm 33 secured in spaced apart relationship by means of the cross bar 35. Between the ends of these two arms extends a thread 37 which passes through openings in the housing 39 secured to the back of the front plate 11, and is wrapped around a spindle 41 journaled in the housing. A small spring 43 is interposed between the end of the thread 37 and the upper arm 31.

The spindle 41 carries at its outer end a pointer 45 rotatable around a graduated dial 47 mounted on the outside of front plate 11. Movement of the balance arm 21 about its pivot 23 accordingly causes rotation of the spindle 41 and the pointer 45.

The ends of the balance arm 21 are formed as arcs of a circle having its center at the axis of rotation of shaft 23 and secured to each end of the balance arm 21 near its top edge is a pair of flexible straps 49, which may be formed of brass and which are secured at their lower ends to two cross plates 51 guided against lateral displacement by the fixed guides 53 secured to the upper side members 9.

Secured to the center of each cross plate 51 and extending downwardly therefrom is a rod 55. Each rod 55 is provided with a plurality, three being shown in the drawings, of collars 57, and slidable along the rod 55 above each of the collars 57 are a series of six weights, three on each rod. The weights are paired to form three sets of different mass, each pair comprising two weights of equal mass, and are designated in order of increasing mass at 59, 61 and 63 on the forward rod 55, and 59', 61' and 63' on the rearward rod 55.

Secured to the central column 5 in line with each pair of weights on the rods 55 are collars 65 provided with transversely extending pins 67 on which are pivoted three lever arms, identical in structure but not in function, and designated generically in the drawings by the reference characters 69, 71 and 73, respectively. Each of these lever arms comprises a pair of side plates 75 in which the pins 67 are journaled, which are secured together in spaced apart relationship by cross bars 77, and, at the ends, by channel members 79. A pin 82 is secured between the flanges of the forward channel member 79, and pivotally mounted on these pins 82 are handle members designated to correspond with the respective lever arms, as 69', 71' and 73'. Each of these handle members extends through one of three reversed E-shaped slots 81 in the front plate 11 of the instrument.

Each of the weights 59, 59'; 61, 61'; 63, 63' is provided with a transversely extending pin 83 adapted to engage, under certain conditions, as hereinafter described, corresponding notches 85 formed in the side plates of each of the lever arms 69, 71 and 73.

The lower end 86 of the rearward rod 55 is guided within a hollow cylinder or collar 87 set between the lower side members 7. Secured in a collar 89' set between the lower side members 7 and extending downwardly beneath the frame is a hollow cylinder 91 formed of a low-heat-conducting material, such as for example, Bakelite, and having its axis coinciding with that of the forward rod 55.

Figure 5:
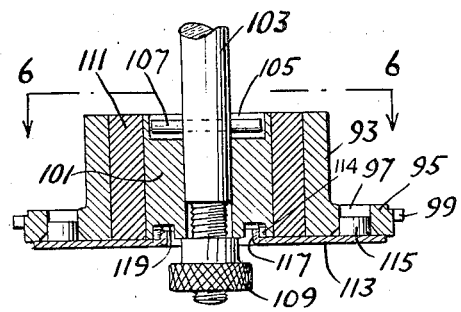
Figure 5 is a detail sectional view showing the coaxial cylinders and the sample to be tested.
Figure 7:
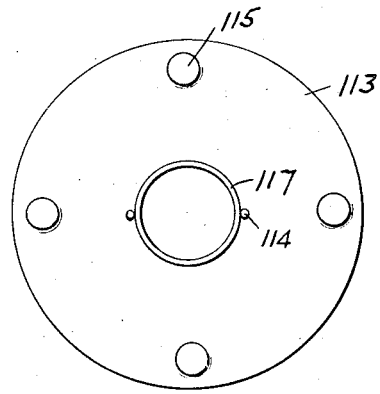
Figure 7 is a detail plan view of the centering plate used in preparing the sample for test.

Referring more particularly to Figure 5, there is shown an outer hollow cylinder 93 provided with an outwardy extending base 95 having a plurality of apertures 97 and an outwardly extending segmental flange 99. An inner cylinder 101, coaxial with the outer cylinder 93, is bored to receive shaft 103, said shaft being formed of low-heat-conducting material, such as, for example, Bakelite, and recessed on its upper surface at 105 to receive the pin 107 carried by the shaft 103. Shaft 103 is threaded at its lower end, and a thumb nut 109 is used to clamp the inner cylinder 101 securely in place on the shaft 103. Between the outer wall of cylinder 101 and the inner wall of cylinder 93 is an annulus 111 of the material undergoing test.

In preparing the sample to undergo test, the two cylinders 93 and 101 are set on the centering plate 113 provided with centering pins 114 and the upper surface of which has been previously treated, as by amalgamation, to prevent adhesion of the material to be tested. The lugs 115 on the surface of this plate are positioned in the apertures 97 in the base of the outer cylinder, and the upturned flange 117 adjacent the center of the plate and the centering pins 114 are positioned within the annular recess 119 in the base of the inner cylinder 101. This insures that the two cylinders are truly coaxial, and eliminates any error in the measurement due to improper positioning of the two cylinders with respect to each other. The sample to be tested, heated, if necessary, to give it the proper fluidity, is poured into the annulus between the two cylinders and permitted to cool or harden. The upper surface is then trimmed flush with that of the two cylinders, and the sample is then ready for insertion into the testing apparatus.

The two cylinders and sample are secured to the lower end of the cylinder 91, which is threaded, by means of the gland nut 121 provided with inturned segmental flanges 123, which engage the segmental flanges 99 on the base of the outer cylinder 93. The inner cylinder is secured to the shaft 103, which extends upwardly within the hollow cylinder 91, and is secured to the lower end of the forward rod 55 by means of the coupling 125.

Figures 1, 2:
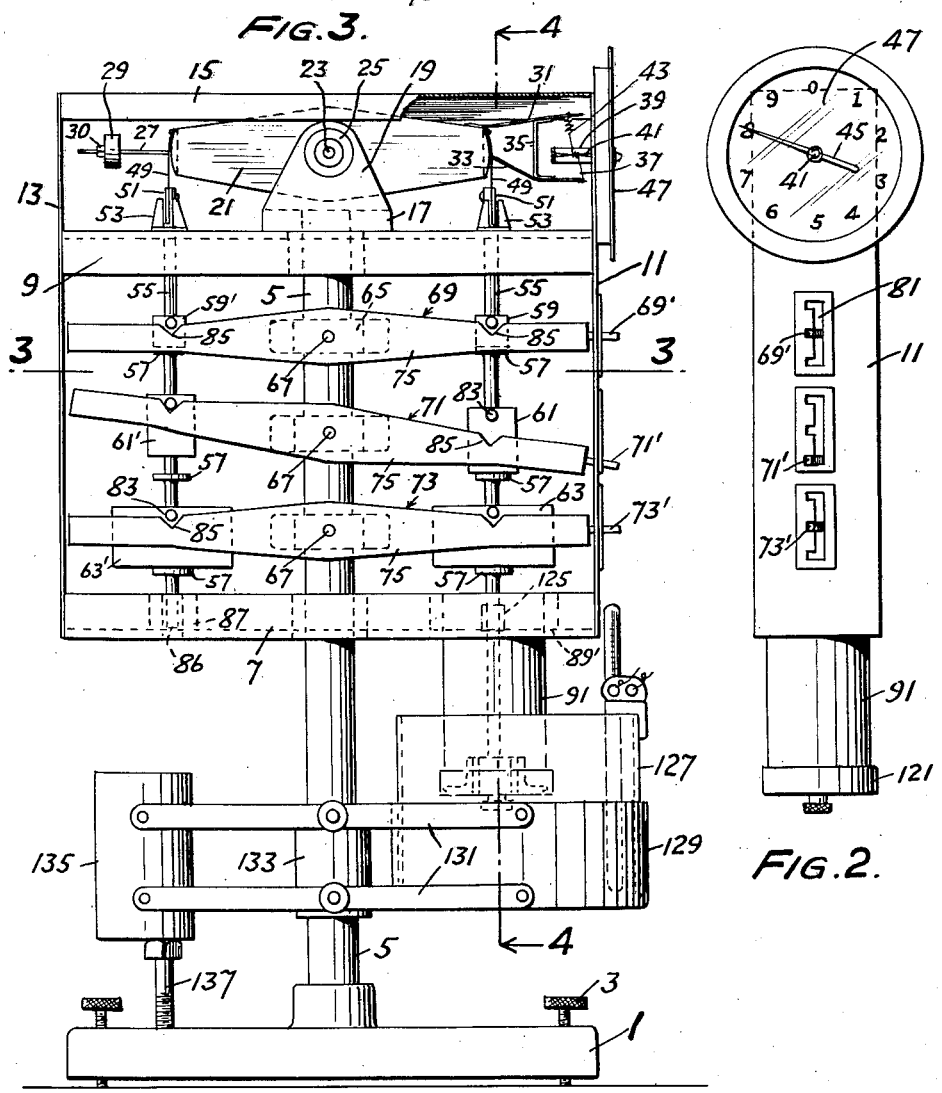
Figure 2 is a front elevation of the main body of the viscosimeter shown in Figure 1, certain of the parts being omitted for clarity.
Figure 4:
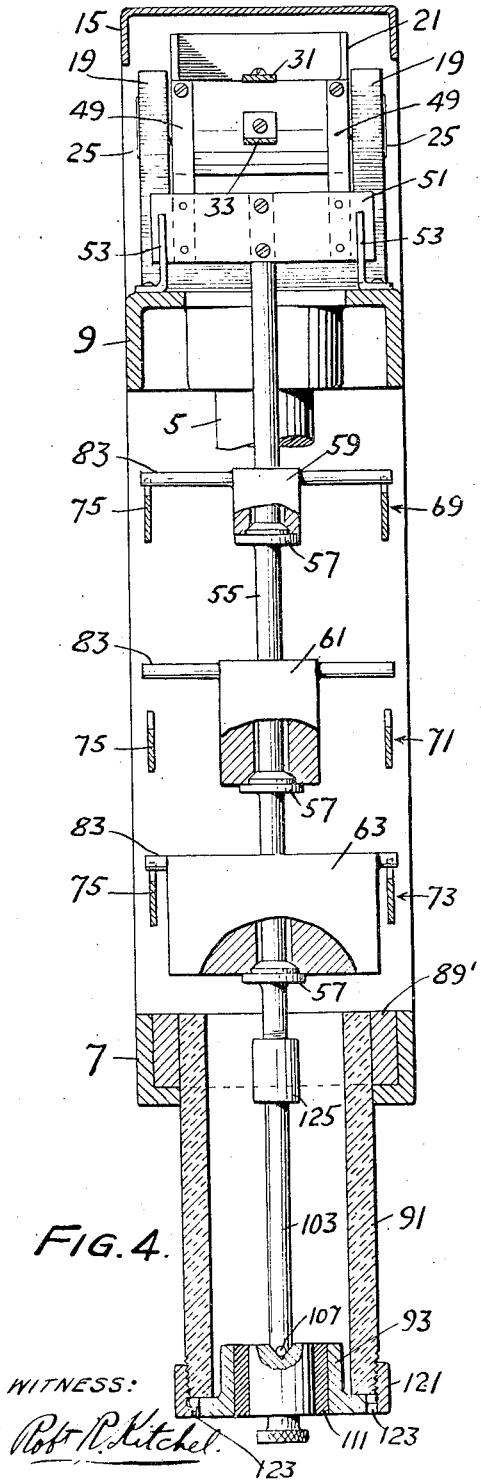
Figure 4 is a vertical section taken on the line 4—4 of Figure 1, certain parts being omitted.
Figure 6:
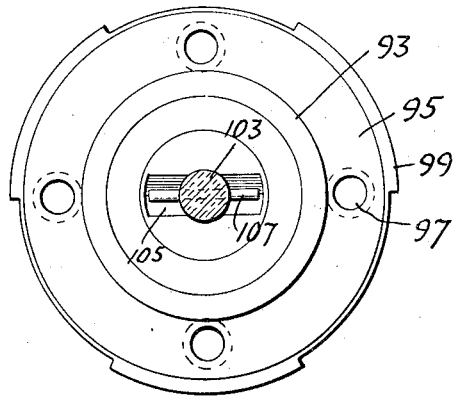
Figure 6 is a horizontal section taken on the line 6—6 of Figure 5.

Surrounding the lower portion of the hollow cylinder 91 and the two coaxial cylinders 93 and 101, together with the sample 111, is a water bath 127 provided with conventional means for circulating the water within the bath to maintain a uniform temperature, and conventional thermostatically controlled means for maintaining a uniform water temperature. The water bath 127 is supported in a pan or cup 129 pivotally connected to links 131, which are in turn pivotally connected at their centers to a collar 133 secured to the column 5, and at their other ends to a counterweight 135. The counterweight 135 exceeds the weight of the pan 129, together with the water bath and contents, and so normally holds it in raised position, as shown in Figure 1, an adjustable stop 137 being provided to adjust the position of the pan 129. The pan 129 may, however, be easily lowered, together with the water bath 127, to permit easy access to the sample at the bottom of cylinder 91.

In operating the instrument, in order to determine the viscosity of a sample of, for example, asphalt, the sample of material is prepared by being flowed into the annulus between the outer cylinder 93 and the inner cylinder 101 while they are in position on the centering plate 113, as described above. After cooling and trimming the pair of cylinders with the sample in position and still held in proper relative position by the centering plate 113, as shown in Figure 5, are then secured to the end of the shaft 103, and the assembly secured in place at the lower end of the cylinder 91, the shaft 103 being connected to the end of the forward rod 55.

The lower end of the cylinder 91, including the inner and outer cylinders of the sample secured thereto, is immersed in the water bath 127, and after waiting a suitable interval for the sample to come to the temperature of the water bath the centering plate 113 is removed. It will be understood that the apparatus has been put into balance by adjustment of weight 29 with the inner cylinder 101 in place and immersed in the water bath in order to compensate for the effective weight of the inner cylinder.

The instrument is then ready to make the viscosity measurement, and this is accomplished by imposing a definite load on the cylinder 101, either in a downward or upward direction, by means of one or more of the weights 59, 59'; 61, 61'; 63, 63'. The particular weight used to impose the load will depend upon whether the approximate viscosity of the sample is high, low or intermediate. Thus, for an asphalt of low viscosity, one of the smaller weights 59, 59' will be employed, while for an asphalt of intermediate viscosity, one of the weights 61, 61' will be used; and similarly, for an asphalt of high viscosity, one of the weights 63, 63' will be used. The load imposed may either initially be in a downward or an upward direction at the option of the operator, but ordinarily it will initially be in a downward direction.

Let us suppose that the operator desires to impose a load equivalent to the mass of one of the weights 61, 61' in a downwardly direction. He will move the handle member 71' of the lever arm 71, associated with the weights 61, 61' to the bottom of its slot 81 in the front plate 11, and move it to one side to engage the lower notch of said slot and so lock the lever arm 71 with its forward end in downward position. This will cause the rearward notch 85 in the lever arm 71 to engage the pin 83 of the weight 61' and so lift the weight off of the collar 57 supporting it.

The other two lever arms, 69 and 73, will be locked in a horizontal position with their handles 69' and 73', respectively, engaged in the central notch of the corresponding slots 81 in the front plate 11. In this position the several weights associated with these lever arms will not be engaged therewith, but will rest upon the collars 57 formed on the rods 55. The system will then be in the position shown in Figure 1, and it will be seen that there is a force acting downwardly on the forward rod 55 equivalent to the masses of weights 59, 61 and 63, while there is a force acting downwardly on the rearward rod 55 (and hence upwardly on the forward rod 55) equivalent to the mass of weights 59' and 63'. Since the several pairs of weights are, as has been previously stated, formed of two weights of equal mass, it will be seen that the net effect is that of a force equivalent to the mass of weight 61 acting downwardly on the forward rod 55. This force is applied through the shaft 103 to the inner cylinder 101, and tends to move this inner cylinder downwardly with respect to the fixed outer cylinder 93, a motion which is opposed by the sample of material undergoing test positioned between the two cylinders. A resulting slow movement of the inner cylinder 101 with reference to the outer cylinder 93 takes place, the rate of which movement is a function of the viscosity of the sample undergoing test.

The motion of the rods 55, which is in no case sufficient, in the period of time allowed for a test, to cause any of the weights to become engaged with the notches 85 in those lever arms which are locked in horizontal position, is transmitted through the balance arm 21, the members 31, 33 and the thread 37 to the needle or pointer 45, and thus the rotational movement of this pointer in a given time, or conversely, the time necessary for the pointer to revolve through a given angle, may be taken as a measure of the viscosity of the sample undergoing test.

It will be apparent that if, for example, the lever arm 71 were moved from the position shown in Figure 1 with its forward end down, to a position with its forward end up, and the handle member 71' locked in the upper notch of its slot in the front plate 11, a force equal to the mass of the weight 61' would be imposed on the forward rod 55 in an upward direction, and there would be a tendency for the inner cylinder 101 to be moved upwardly with reference to the outer cylinder 93. In practice, an actual test of a sample for viscosity will usually comprise a series of determinations in which the force is applied alternately downwardly and then upwardly.

It will also be seen that any of the other weights may be brought into action so as to impart either a downward or an upward force to the forward rod 55 by suitable movement of the lever arms associated therewith. Thus, whenever one of the handle members associated with these lever arms is locked in the upper notch of its slot 81, the weights associated with such lever are acting in an upward direction on the forward rod 55 and the inner cylinder 101. When such handle member is locked in the lower notch in its slot 81, the weights associated therewith are acting in a downward direction, while when such handle member is locked in the central notch in its slot 81, then the weights associated therewith act to balance each other, and hence impose no force, either upward or downward, on the inner cylinder 101.

It will be seen that the instrument in accordance with this invention enables an operator, even a somewhat unskilled one, to impose a definite and reproducible force in either an upward or a downward direction on the inner cylinder 101 of the pair of coaxial cylinders, and to read directly and easily the movement of such inner cylinder under the action of such force on a calibrated dial so that the rate of movement, from which the viscosity may be calculated, can be easily determined.

The viscosity of the material undergoing test may be determined from the data obtained by use of our viscosimeter by means of the following equation, developed by Pochettino:

$$\eta = \frac{g}{2\pi Lv}\left[\{(w-w_o) - \pi r^2 L(D-d)\} \log_e \frac{R}{r} + \frac{\pi}{2}L(D-d)(R^2-r^2)\right]$$

in which:
$\eta$ = viscosity in poises
$g$ = gravitational constant
$L$ = length in cm. of annulus of material
$v$ = rate of movement of inner cylinder past the outer in cm./sec.
$w$ = total load in grams applied to inner cylinder
$w_o$ = buoyant force in grams acting on $w$
$R$ = inner radius hollow cylinder in cm.
$r$ = outer radius inner cylinder in cm.
$D$ = density material being tested in g./cm.$^3$
$d$ = density of medium in which sample is immersed in g./cm.$^3$ The densities of asphalt and water may be both assumed to be equal to 1 without introducing appreciable error, and $D-d$ may be set equal to 0. And since in operation the instrument is initially balanced with reference to the effective weight of the inner cylinder 101, $w_o$ may also be set equal to 0. The equation above then becomes:

$$\eta = \frac{g \cdot w}{2\pi Lv} \cdot \log_e \frac{R}{r} = \frac{2.303 g w}{2\pi L} \cdot \log_{10} \frac{R}{r} \cdot \frac{t}{h}$$

in which:
$t$ = time in seconds
$h$ = distance moved by the inner cylinder 101 in centimeters
where $h$ is the movement in centimeters of the inner cylinder with respect to the outer in $t$ seconds.

In any given instrument R, $r$ and L are constants, and our investigations have shown that the value $$\left(\frac{R-r}{L}\right)$$

should be kept below 0.5 if satisfactory and consistent results are to be obtained. In addition, the value of $(R-r)$ must not be too small or wall effects will prevent a measurement of the actual laminar flow and determination of true viscosity. We have found that the following values of R, $r$ and L are very satisfactory for use in an instrument of the type here described:

$$R = \tfrac{3}{4}'' \ (1.905 \text{ cm.})$$
$$r = \tfrac{1}{2}'' \ (1.270 \text{ cm.})$$
$$L = 1'' \ (2.540 \text{ cm.})$$
$$\frac{R-r}{L} = 0.25$$

Volume of annulus = 16.1 cc.

Substituting these values in the above equation, we have:

$$\eta = \frac{t}{h}(24.92w)$$

or, selecting an arbitrary series of weights, $w_1$, $w_2$, $w_3$, etc. and an arbitrary distance $h$, the equation may be written $$\eta = Kt$$

and $\eta$ may be calculated directly from the elapsed time measured by the operator.

In an instrument having the values of R, $r$ and L above described, the weights may conveniently have the following masses:

Weights 59, 59'_____ 40+$f$ grams where $f$ is the friction (in grams) opposing movement of the balance arm 21.

Weights 61, 61'_____ 400+$f$ grams
Weights 63, 63'_____ 4000+$f$ grams

The arbitrary distance $h$ will conveniently be 0.1 cm. (1 mm.), and the dial 47 may be calibrated so that 1 revolution equals 2 mm. movement.

The operator, in making the test, will desirably wait until after the inner cylinder has moved the first millimeter (to eliminate inertia and elasticity as factors) and then read the time $t$ for the pointer 47 to move 5 dial divisions. The viscosity in poises of the material being tested is then given with sufficient accuracy by multiplying $t$ by the proper value of K, as follows:

K for weights 59, 59' = $10^4$
K for weights 61, 61' = $10^5$
K for weights 63, 63' = $10^6$

What we claim and desire to protect by Letters Patent is:

1. A viscosimeter comprising a pair of coaxial cylinders, the outer of which is hollow, whereby an annular space is provided between the cylinders to receive a sample of viscous material to be tested, a frame, means for retaining the outer cylinder in fixed position with reference to said frame, a balance arm pivotally mounted in said frame, rods dependent from each end of said balance arm, means for applying variable loads to either of said rods, and means connecting one of said rods to said inner cylinder so that movement of said rods will move said cylinder along the common axis of the two cylinders.

2. A viscosimeter comprising a pair of coaxial cylinders, the outer of which is hollow, whereby an annular space is provided between the cylinders to receive a sample of viscous material to be tested, a frame, means for retaining the outer cylinder in fixed position with reference to said frame, a balance arm pivotally mounted in said frame, rods dependent from each end of said balance arm, means for applying variable loads to either of said rods, means connecting one of said rods to said inner cylinder so that movement of said rod will move said cylinder along the common axis of the two cylinders, and means operatively connected to the movable system comprising the balance arm, rods and inner cylinder to indicate the movement of the inner cylinder with respect to the outer cylinder.

3. A viscosimeter comprising a pair of coaxial cylinders, the outer of which is hollow, whereby an annular space is provided between the cylinders to receive a sample of viscous material to be tested, a frame, means for retaining the outer cylinder in fixed position with reference to said frame, a balance arm pivotally mounted in said frame, rods dependent from each end of said balance arm, means for applying variable loads to either of said rods, and means connecting one of said rods to said inner cylinder so that movement of said rod will move said cylinder along the common axis of the two cylinders, said means for retaining the outer cylinder in fixed position with reference to the frame and said connecting means between said inner cylinder and the rod being formed of low heat-conducting material.

4. A viscosimeter comprising a pair of coaxial cylinders, the outer of which is hollow, whereby an annular space is provided between the cylinders to receive a sample of viscous material to be tested, a frame, means for retaining the outer cylinder in fixed position with reference to said frame, a balance arm pivotally mounted in said frame, a rod dependent from each end of said balance arm, a plurality of collars on each of said rods, a plurality of weights each slidably mounted on said rods above each collar and normally resting thereon, each weight on one rod being paired with a weight of equal mass on the second rod and each pair of weights having different masses, whereby the system as a whole is balanced, means for raising any weight off from the collar on which it normally rests and retaining it in such raised position, thereby unbalancing the system, and means connecting one of said rods to said inner cylinder so that movement of said rod will move said cylinder along the common axis of the two cylinders.

5. A viscosimeter comprising a pair of coaxial cylinders, the outer of which is hollow, whereby an annular space is provided between the cylinders to receive a sample of viscous material to be tested, a frame, means for retaining the outer cylinder in fixed position with reference to said frame, a balance arm pivotally mounted in said frame, a rod dependent from each end of said balance arm, a plurality of collars on each of said rods, a plurality of weights each slidably mounted on said rods above each collar and normally resting thereon, each weight on one rod being paired with a weight of equal mass on the second rod and each pair of weights having different masses, whereby the system as a whole is balanced, means for raising any weight off from the collar on which it normally rests and retaining it in such raised position, thereby unbalancing the system, means connecting one of said rods to said inner cylinder so that movement of said rod will move said cylinder along the common axis of the two cylinders, and means operatively connected to said balance arm to magnify and indicate the motion thereof.

6. A viscosimeter comprising a pair of coaxial cylinders, the outer of which is hollow, whereby an annular space is provided between the cylinders to receive a sample of viscous material to be tested, a frame, means for retaining the outer cylinder in fixed position with reference to said frame, a balance arm pivotally mounted in said frame, a rod dependent from each end of said balance arm, a plurality of collars on each of said rods, a plurality of weights each slidably mounted on said rods above each collar and normally resting thereon, each weight on one rod being paired with a weight of equal mass on the second rod and each pair of weights having different masses, whereby the system as a whole is balanced, a plurality of lever arms, one for each pair of weights, pivotally mounted adjacent their centers in said frame, each lever arm being adapted to engage and raise off from the collar on which it normally rests one weight of a pair when tilted in one direction and the other weight of that pair when tilted in the other direction, and to engage neither weight when in horizontal position, whereby the system may be unbalanced by movement of said lever arms, and means to lock any one of said lever arms in any one of the three positions indicated.

7. A viscosimeter comprising a pair of coaxial cylinders, the outer of which is hollow, whereby an annular space is provided between the cylinders to receive a sample of viscous material to be tested, means for retaining the outer cylinder in fixed position, a balance arm, rods dependent from each end of said balance arm, means for applying variable loads to either of said rods, means connecting one of said rods to said inner cylinder so that movement of said rod will move said cylinder along the common axis of the two cylinders, and means for indicating the movement of the inner cylinder with respect to the outer cylinder.

8. A viscosimeter comprising a pair of coaxial cylinders, the outer of which is hollow, whereby an annular space is provided between the cylinders to receive a sample of viscous material to be tested for laminar flow therebetween, said outer cylinder being open at the top and bottom thereof, means for retaining one of said cylinders in fixed position, means for imposing a force on the other cylinder to move it along the common axis of the two cylinders so that a sample contained only in said annular space will be stressed only in the direction of relative movement of the cylinders, and means operatively connected to said last-named means to indicate the extent of movement of the movable cylinder along the common axis of said cylinders.

9. A viscosimeter, as described in claim 8, additionally characterized by the fact that the ratio $$\frac{R-r}{L}$$

where R is the inner radius of the hollow outer cylinder, $r$ is the outer radius of the inner cylinder, and L is the length of the annulus between the cylinders, is not greater than 0.5.

HAROLD P. HAYDEN.
HERBERT E. SCHWEYER.